United States Patent [19]
Bradley et al.

[11] Patent Number: 4,733,733
[45] Date of Patent: Mar. 29, 1988

[54] METHOD OF CONTROLLING THE DIRECTION OF A DRILL BIT IN A BOREHOLE

[75] Inventors: William B. Bradley; John E. Fontenot, both of Houston, Tex.

[73] Assignee: NL Industries, Inc., New York, N.Y.

[21] Appl. No.: 828,392

[22] Filed: Feb. 11, 1986

[51] Int. Cl.$^4$ .............................................. E21B 7/04
[52] U.S. Cl. ........................................ 175/45; 175/61
[58] Field of Search ....................... 175/26, 27, 45, 61

[56] References Cited
U.S. PATENT DOCUMENTS

| | | | |
|---|---|---|---|
| 4,015,673 | 4/1977 | Craig, Jr. et al. | 175/61 |
| 4,303,994 | 12/1981 | Tanguy | 175/45 |
| 4,324,297 | 4/1982 | Denison | 175/45 |
| 4,445,578 | 5/1984 | Millheim | 175/45 |
| 4,479,564 | 10/1984 | Tanguy | 175/45 |

Primary Examiner—Stephen J. Novosad
Assistant Examiner—William P. Neuder
Attorney, Agent, or Firm—Browning, Bushman, Zamecki & Anderson

[57] ABSTRACT

A system for controlling the direction of a drill bit in a borehole utilizes both a drill string model and a bit-rock directional interaction model to compare ideal predicted or expected moments with real time measured moments to arrive at correction data necessary to return the bit to its desired path. The magnitude and direction of moments generated near the bit are measured in a downhole equipment sub, containing a microprocessor and memory, so that the real time data can be collected and acted upon without undue delay thereby minimizing drilling time lost due to deviations from the desired path.

10 Claims, 4 Drawing Figures

METHOD OF CONTROLLING THE DIRECTION OF A DRILL BIT IN A BOREHOLE

BACKGROUND OF THE INVENTION

1. Field of the Invention

The present invention relates to a method utilizing bending moment measurements taken near a drill bit to control the direction of the drill bit.

2. Description of the Prior Art

When a borehole is drilled in the search for petroleum, it is necessary to control the direction of the drill bit in order to intercept the target formation at the correct location. It is substantially impossible to drill a straight borehole utilizing either of the two standard techniques, namely either by rotating the entire drill string by a kelly and associated equipment or by having a downhole motor driving the drill bit. Many factors, such as gravitational effects, bending of the drill collars, the torque of the drilling action and the anisotropic failure character of rock contribute to causing deviation in the drill bit direction.

In the past, the one way of controlling the drill bit direction has been to cease the drilling operations and lower into the borehole an instrument to make directional measurements. These measurements would then be compiled with a past performance record and a model for the desired borehole path and the desired corrections made by adjusting the weight-on-bit, rotary speed, etc. to achieve the desired change in direction of the bit. If these changes proved inadequate to redirect the bit to the desired direction, it was necessary to pull the drill string from the thole and change the down hole assembly configuration of the drill string. It will be appreciated by those skilled in the art that any operation, such as this, which interrupts drilling is going to be costly and time consuming.

Another more recent development is measuring-while-drilling equipment which enables directional measurements to be made and corrections accomplished without interrupting the drilling operation. However, the hole must be drilled and surveyed by the measuring-while-drilling equipment before one can determine the result. An example of such a method may be found in U.S. Pat. No. 4,324,297 in which strain measurements are taken immediately adjacent the drill bit. The inclination and orientation of the drill bit are measured, along with the weight on the drill bit, and all of these measurements transmitted to the surface, preferably by a high data rate hard wired electronic system, where they are compared to a model developed from the previous measurements to determine the deviation of the drill bit from a desired course. The weight-on-bit and rotary speed are then controlled to achieve a correction to return the bit to the desired path. While this is an improvement over stopping the drilling for measurement, as previously discussed, it still has a number of drawbacks. These include the amount of data which must be transmitted to the surface, only a portion of which is subsequently used, and the cost and trouble of deploying a hardwire system.

SUMMARY OF THE INVENTION

The present invention utilizes a near bit mechanics sensor and position monitor sensor of a measuring-while-drilling portion of a downhole assembly to measure the magnitude of bending moments in two orthogonal planes and the orientation of these moments to indicate deviation from the desired trajectory of the drill bit. The magnitude and direction of the bending moments together with the bit penetration rate, in comparison with a drill string model and a bit-rock directional well interaction model, allows for corrective action to be taken to change the direction of the borehole as it is currently being drilled. The present invention utilizes real time information of downhole factors affecting drill bit direction to arrive at information necessary to make the desired corrections. The present invention works not only from a drill string model, but from a bit-rock directional well interaction model with all of the data being collected and computed by a downhole microprocessor in order to minimize deviation and correction time.

BRIEF DESCRIPTION OF THE DRAWINGS

The present invention will now be described by way of example with reference to the accompanying drawings in which.

DESCRIPTION OF THE PREFERRED EMBODIMENT

Figure 1:
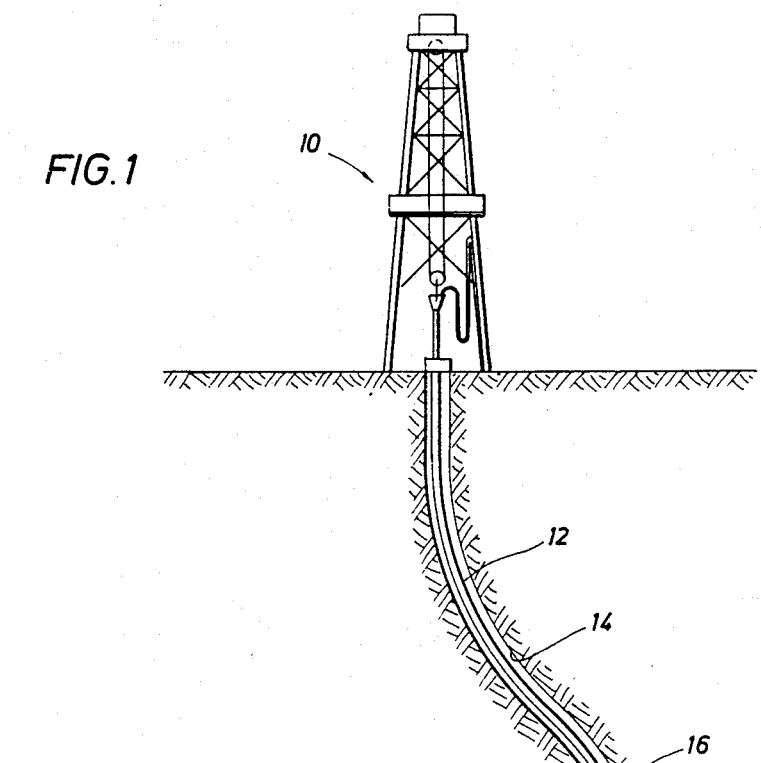
FIG. 1 is a diagrammatic representation of a drill rig drilling a borehole.
Figure 2:
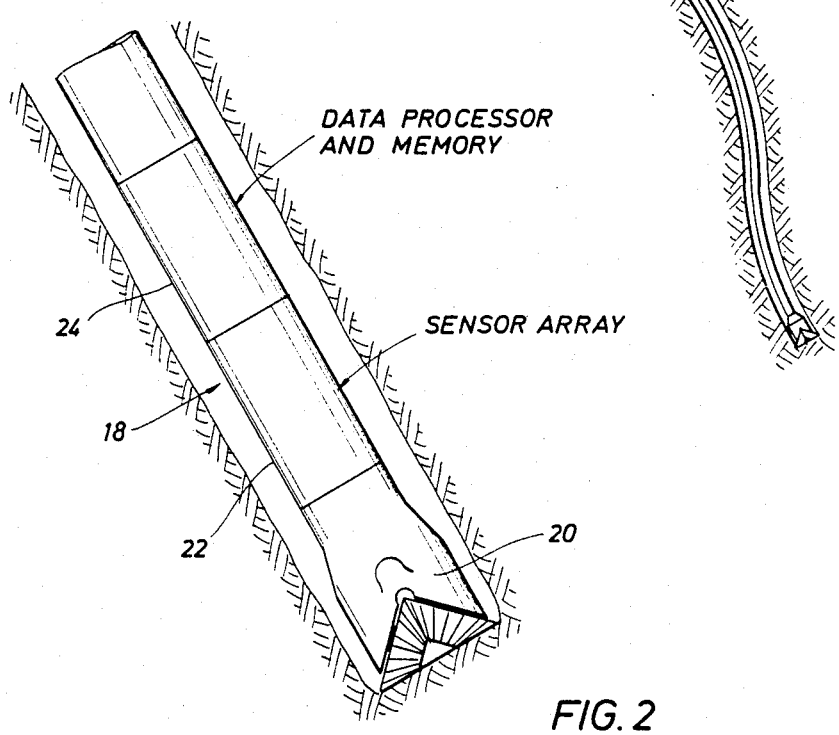
FIG. 2 is a diagrammatic side elevation of the downhole assembly.

A standard drilling assembly is shown in FIG. 1 including a drill rig 10 having a drill string 12 depending therefrom through a borehole 14 in a formation 16. At the bottom end of the drill string there is a downhole assembly 18 including a drill bit 20, a sensor array 22 and a data processor and memory 24.

The sensor array 22 includes a first portion for taking bending moment measurements, for example by strain gauges (not shown) in at least two orthogonal planes and a second portion for determining the orientation of these moments, for example by magnetometers (also not shown). By knowing the configuration of the bottom hole assembly and the bending moment in the drill string near the bit, an indication of the forces acting between the bit and the formation, namely the bit-rock interaction forces, can be determined. The bending moment measurements, together with measurements of penetration, provide for a real time indication of any change in direction of the borehole as it is currently being drilled. This indication provides a monitor and control capability of the change in borehole direction between statically determined survey points, normally taken when drilling is stopped during connection of additional sections of pipe to the drill string.

Normally, there will be many bending moments measured during the course of a drilling operation. These bending moments will be characteristic of many things, such as drill string mechanics, drill string-formation interaction, bit type and condition, gravitational effects, etc. The moments can be characterized as having a dynamic component superimposed on more slowly varying component. The dynamic moments can be compared to mechanical "chatter" or background electrical noise and can be obviated by filtering. The slowly varying moments, which can be sustained level, increasing and decreasing moments usually relate to conditions which will cause the drill bit to deviate from its intended course. In this case, appropriate corrective action must be taken to return the drill bit to the intended path in order to assure that the target formation is encountered within tolerance limits and to avoid wasting drilling time.

In addition to providing monitor and control of the drill bit, the present invention can be used in a learning mode to model change in bit-rock interaction characteristics with time. This can be accomplished by comparing the predicted change in hole angle with the real time direction derived from bending moments and with the static results taken at each survey point. The difference between static reading, the predicted reading, and real time measurement provides an error signal which can be used to improve the estimates of bit-rock interaction characteristics of the specific rock being drilled with the specific bit. Utilizing this error signal to update the bit-rock interaction characteristics will allow the changes in formation and bit characteristics to be incorporated as the drilling proceeds.

In normal drilling operations, either when a downhole motor is used to drive the bit or when a kelly and associated equipment are used to rotate the entire drill string from the surface, the drill string is subject to many forces and moments resulting from drill string mechanics, drill string-formation interaction, gravitational forces, bit type and wear, and the like. These have an effect on bit direction so that it is possible to measure the magnitude and orientation of near bit bending moments caused by these forces and utilize the measurements for bit direction correction. It is preferable to be able to make these measurements with a microprocessor located downhole in the equipment sub in order to lessen the requirement for high speed data transmission capability or reduce the response time.

Figure 3:
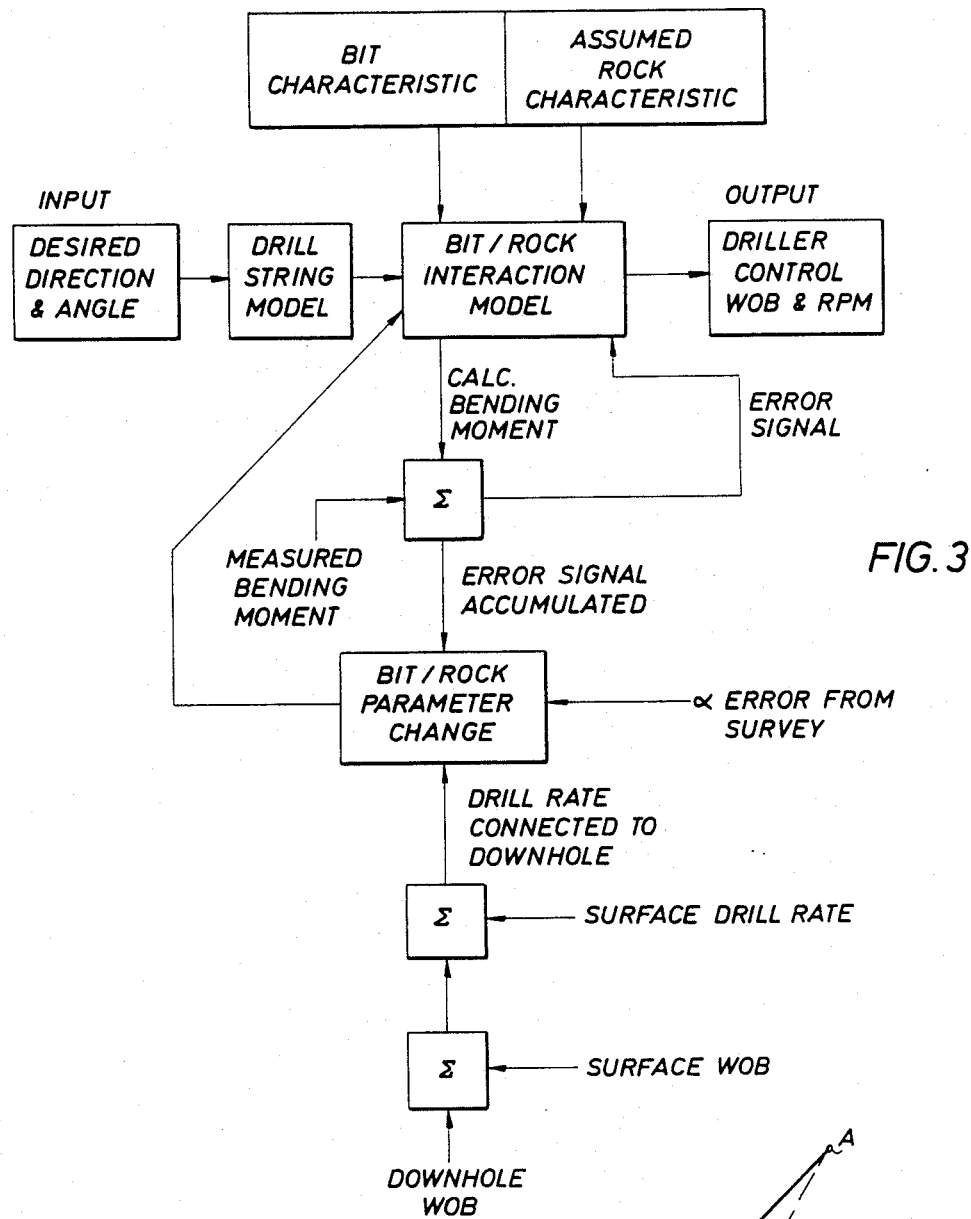
FIG. 3 is a block level schematic of the control portion of the present invention.

The operation of the present invention will be described with reference to FIG. 3. Input data originates at the surface and contains information derived from previous seismic surveys, etc. as to the desired direction and angle for the borehole to reach from the earth's surface to the target surface formation. This input information is used to configure drill string model which, in turn, provides one input to a bit-rock interaction model, which preferably is the microprocesser and memory 24 located downhole. The bit-rock directional well interaction model also receives inputs of bit characteristics, assumed rock characteristics, and error signals from a first comparator comparing desired and measured bending moments and a second comparator comparing actual and assumed bit-rock characteristics. The second comparator also receives input from a third comparator comparing surface and downhole weight-on-bit and surface drill rate measurements. The output of the bit-rock interaction model is fed to a surface driller control display to indicate adjustments to the weight-on-bit and rpm of the drill string that are required to keep the bit on path or return it to the desired path.

The bit-rock directional well interaction model takes the bit characteristics information, assumed rock characteristics and heading data developed by the drill string model from the desired heading arrived at from seismic survey and determines an expected or ideal bending moment which is compared to actual bending moments measured near the bit. The difference between actual and expected or ideal bending moments is used as an error signal to correct the bit-rock interaction model and bit-rock parameter characteristics. This can further be corrected by a rock properties measurement, such as a gamma reading made downhole by known measuring-while-drilling equipment, and corrections for the actual downhole drilling rate to revise rock characteristics for the bit-rock directional well interaction model. Thus, the subject method constantly corrects for the actual conditions as they are encountered in real time.

Figure 4:
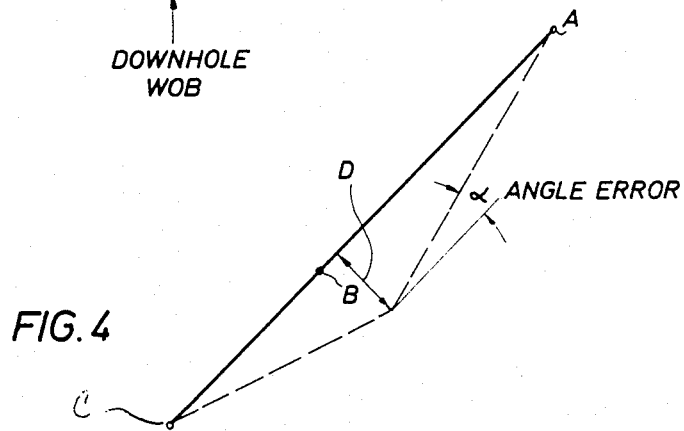
FIG. 4 is a diagram illustrating the operation of the present invention.

An example may be seen in FIG. 4. The intended path of the drill is from A to B. However, the bit deviates, for any reason, resulting in an offset D instead of reaching point B. This requires that an angle error correction be applied to the drill string to bring the bit back to the intended drill line ABC.

The foregoing disclosure and description of the invention is illustrative and explanatory thereof, and various changes in the method steps may be made within the scope of the appended claims without departing from the spirit of the invention.

We claim:

1. A method for controlling directional drilling of a bit on the lower end of a drill string, comprising the steps of:

measuring bending moments in two orthogonal planes on a portion of said drill string closely adjacent said bit;

measuring the inclination and orientation headings of said bit during said bending moment measurements;

measuring the penetration rate of said bit into a rock formation;

developing a bit-rock directional well interaction model and comparing said measured moments and headings with said model in a downhole microprocessor to derive error signals; and controlling said bit direction in response to said error signals.

2. A method according to claim 1 further comprising the step of:

using said error signal to reformulate said bit-rock interaction model.

3. A methoc according to claim 1 further comprising the step of:

using measuring-while-drilling survey information to reformulate said bit-rock interaction model.

4. A method according to claim 1 further comprising the step of:

using the difference between surface and downhole weight-on-bit measurements to reformulate said bit-rock interaction model.

5. A method according to claim 1 further comprising the step of:

using bit characteristic and assumed rock characteristic information to develop said bit-rock interaction model.

6. A system for controlling directional drilling of a bit on the lower end of a drill string, comprising:

means to measure the magnitude and direction of bending moments in two orthogonal planes on a portion of said drill string in close proximity to said bit;

means to measure the inclination and orientation headings of said bit during said bending moment measurements;

means to measure the penetration rate of said bit into a rock formation;

means to develop a bit-rock directional well interaction model and compare said measured moments and headings with said model to develop an error signal; and means responsive to said error signal to control the direction of said bit.

7. A system according to claim 6 wherein said means to develop a bit-rock directional well interaction model is a microprocessor and memory located downhole on the drill string.

8. A system according to claim 6 wherein said means to develop a bit-rock directional well interaction model receives measuring-while-drilling information and utilizes it to modify the bit-rock directional well interaction model in accordance with the formation currently being encountered by said bit.

9. A system according to claim 6 further comprising:
means to compare actual bending moment measurements with bending moment measurements derived from said bit-rock directional well interaction model and produce an error signal used to reformulate said bit-rock directional well interaction model.

10. A system according to claim 6 further comprising:
means to feed bit characteristic and assumed rock characteristic data to said means to develop a bit-rock directional well interaction model.

* * * * *